Sept. 12, 1950        R. H. EDWARDS        2,522,104
SELF-RETRACTING WHEEL CHOCK FOR AUTOMOTIVE VEHICLES
Filed April 20, 1948        2 Sheets-Sheet 1
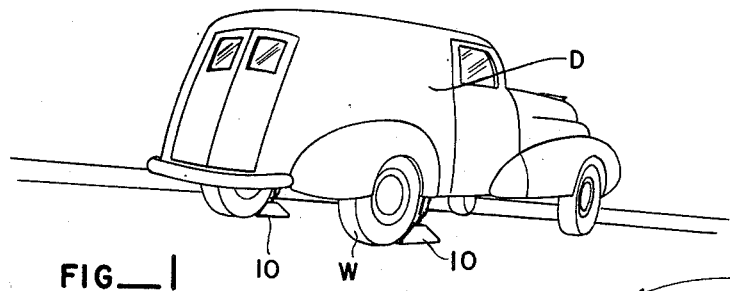
FIG.__1
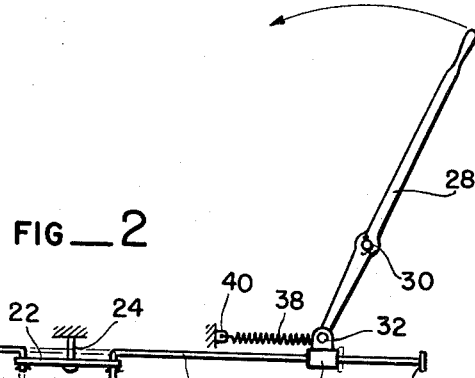
FIG.__2
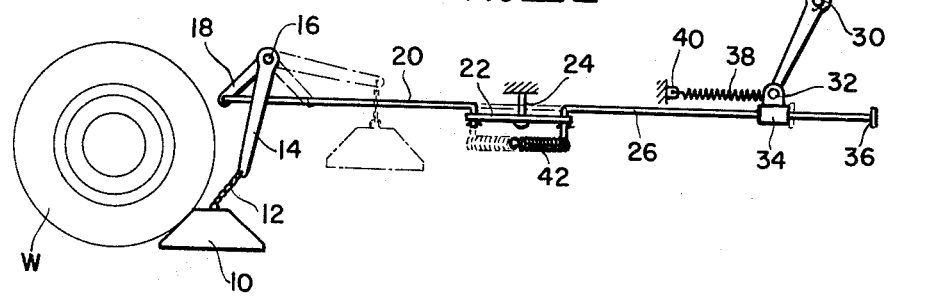
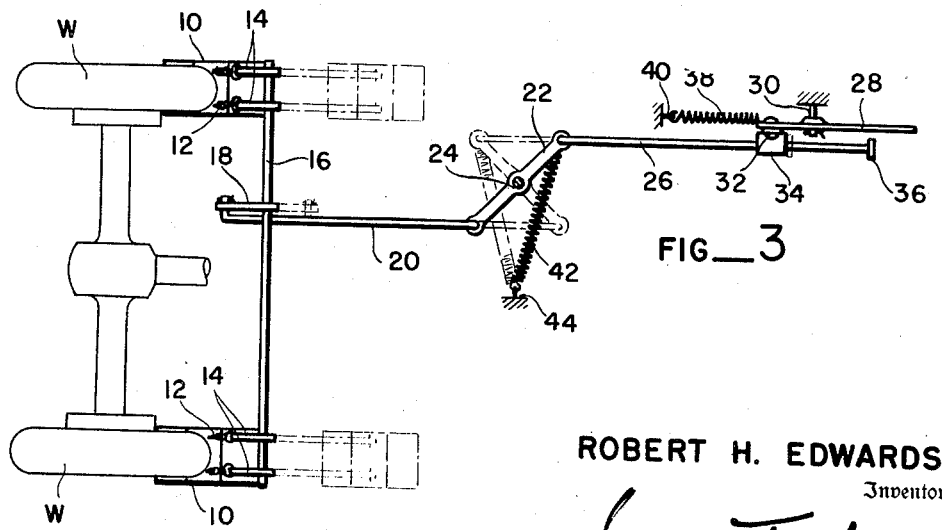
FIG.__3
ROBERT H. EDWARDS
Inventor
By *Smith & Tuck*
Attorneys

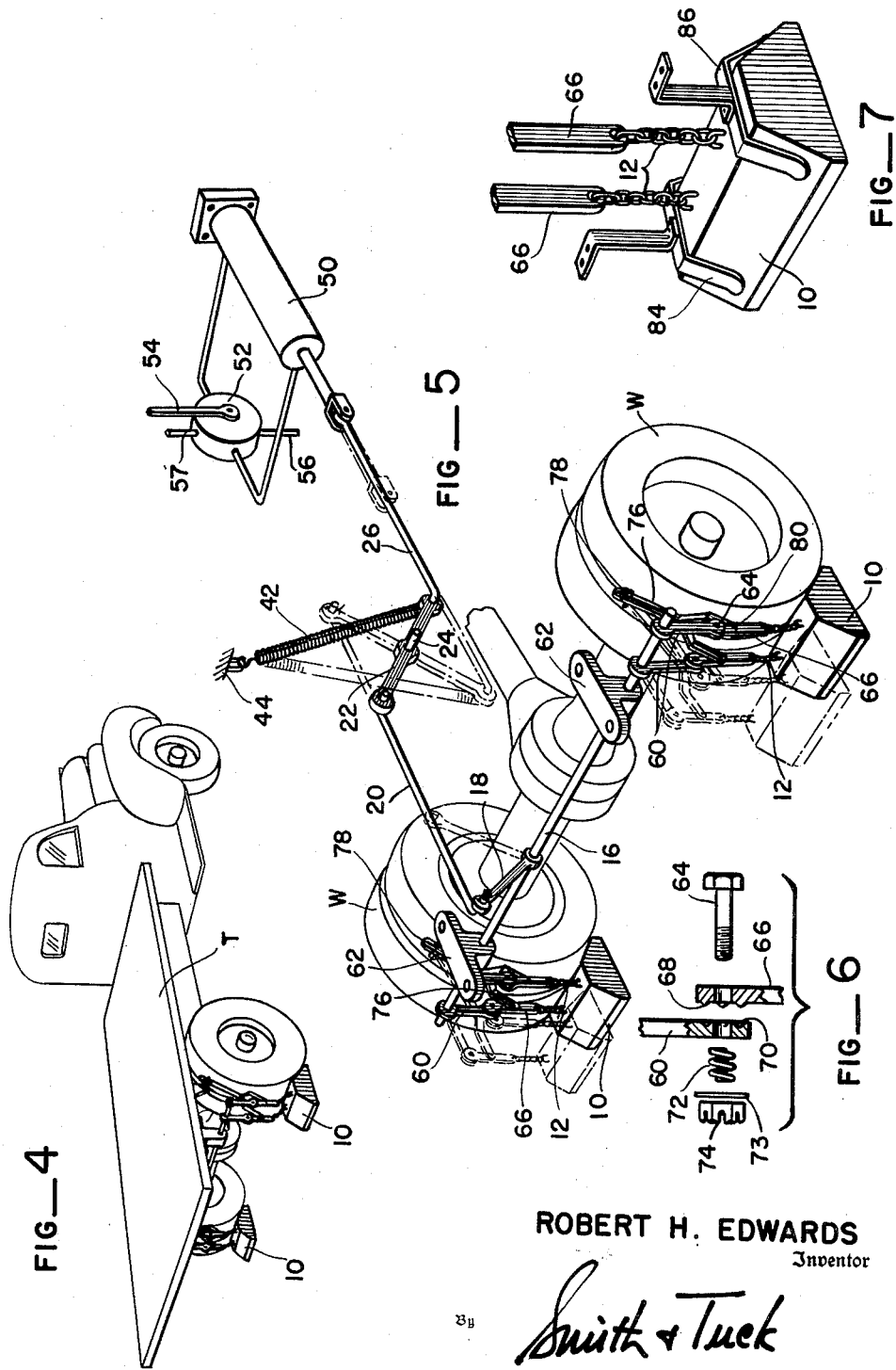

Patented Sept. 12, 1950

2,522,104

UNITED STATES PATENT OFFICE 2,522,104

SELF-RETRACTING WHEEL CHOCK FOR AUTOMOTIVE VEHICLES

Robert H. Edwards, Seattle, Wash.

Application April 20, 1948, Serial No. 22,175

2 Claims. (Cl. 188—4)

My present invention relates to the general art of wheel chocks, and more particularly to a self retracting wheel chock for automotive vehicles.

Wedge-shaped blocks or chocks have been used for a long period to stop the unwanted movement of rolling wheels. In railroad use, they have been used as safety devices largely, and in the days of horse-drawn vehicles, chocks were used considerably to hold the load of the vehicle during periods when it was necessary to rest the horses, and the like. In the present day automotive field, it has been found that where hilly conditions are encountered, there is a very great need for a chock to be used when the vehicle is parked, as in loading or unloading, or left standing for a period, and in the very hilly countries it is also found very desirable to have a chock available that can be quickly inserted behind the rear wheels of a truck, for instance, in order to prevent it from moving backwards on a steep grade. Heavily loaded trucks always present a severe braking problem in mountainous countries, particularly, and it is common to use the compression of the power plant to assist in braking a load down steep hills. However, if the motor of the truck is stopped or has not been started, the driver normally has nothing available to him excepting his actual brakes, and normally it is very difficult to make quick shifts of a truck transmission, unless the motor is running. Under such conditions, a large measure of safety is provided in having a chock that can be quickly tripped from the cab of the truck, and which will be so arranged by mechanical means that the chock will be lowered to the ground and in the proper position to most favorably engage the wheels.

In the past, one of the greatest deterrents in using a chock as part of the truck equipment has been the difficulty of having the chock so arranged that it can be handled from the cab, and particularly retracted after it is used. In the days of horse-drawn vehicles, this was not so important as the chock could actually be dragged along the ground without undue harm to the chock, the road, or the vehicle. However, with the high speeds now attainable by trucks of all sizes, a chock bouncing along the ground can do great damage, and may itself actually lead to an accident to the very vehicle it is endeavoring to protect, due to its bouncing into a position where it may lock the wheels or spring arrangements of the vehicles.

In my present chock and its handling means, I believe I have overcome the deficiencies of previously existing equipment. I provide, for instance, a chock which is positioned by releasing the supporting mechanism from the cab of the truck or car, and when so released, the mechanism itself will swing the chock into the most favorable position for use. In designing such equipment, it must always be taken into account that the chock and its handling mechanism normally will be supported from the body of the vehicle, and the loading of the vehicle through the spring deflection may change considerably the distance from the body to the ground; therefore, means must be provided to cover quite a range of height. Further, I have provided means for retracting the chock which, while capable of manual manipulation, is so arranged that without any attention from the driver, it will normally actuate the retracting mechanism of its own dead weight, as the truck moves on and attempts to leave it in place, so that a full measure of safety and convenience is assured. I further provide means for holding the chock in a definite position during the travelling period.

The principal object of my present invention, therefore, is to provide a wheel chock which may be positioned from the driver's seat of a motor vehicle and which will be self-retracting when the vehicle is moving.

A further object of my invention is to provide a control means for a wheel chock, which after the setting movement is initiated, will be carried on to completion automatically.

A further object of my invention is to provide means whereby, when a motor vehicle moves away from the chock that has been in use, the weight of the chock will be sufficient to actuate the retracting means, and thus re-position the chock into its carrying position.

A further object of my present invention is to provide suitable means so that wheel chocks can be placed from the driver's position, either in front of wheels, or back of wheels.

A further object of my invention is to provide a chock handling mechanism, which may be actuated manually, either by the hand or foot, or by means operated by hydraulic or vacuum pressure, by air pressure, or by electricity.

A further object of my invention is to provide a chock handling arrangement that will properly position a chock to operate against a wheel without regard to whether the truck is loaded or light.

Further objects, advantages and capabilities will be apparent from the description and disclosure in the drawings, or may be comprehended or are inherent in the device.

Fig. 1 is a perspective view showing a light delivery truck nosed into a curve and showing my wheel chock as employed in front of the driving wheel.

Fig. 2 is a side elevation, in somewhat fragmentary form, showing the carrying position of my chock in dot-and-dash lines, and the service or using position in full lines.

Fig. 3 is a top plan view of the arrangements of the Figs. 1 and 2, showing the position of my chock in solid lines as it is used, and in dot-and-dash lines, in the position the parts assume when out of use.

Fig. 4 is a perspective view of a flat bed truck employing my chocks behind the driving wheels.

Fig. 5 is a perspective view showing my chocks in their position of use in solid lines, and in their retracted position, together with their operating mechanism, in dot-and-dash lines.

Fig. 6 is an exploded view, partly in section, and bracketed, showing the pivot means employed in my pivoted arms.

Fig. 7 is an enlarged view showing my chock proper, its supporting linkage, and the bracket arrangement that is normally fixedly secured to the body of the truck, and which secures my chock in its travelling position.

Referring more particularly to the disclosure in the drawings, for illustrative purposes, I have shown two general forms of my chock and its operating mechanism. Figs. 1 through 3 show a simplified manual arrangement where the chock is employed in front of the driving wheel. In Figs. 4 and 5, I have illustrated the chock and its operating mechanism as employed where the chocks are behind the driving wheel. In this latter form, I have illustrated a fluid cylinder as the operating means. This might be operated by air-pressure, vacuum or hydraulic. In both forms, however, the device consists essentially of one or more blocks which have a carrying position and a using position where the block rests upon the roadway and against the wheel. An operating mechanism is employed for the initiation of the action and an intermediate mechanism is employed which will complete the operation, once it has been initiated in placing the chock, and which serves as a means for automatically restoring the chock to the touring position after the effort has been initiated.

Referring to the showings of Figs. 1, 2 and 3, I have illustrated a delivery truck D employing the chock 10, and in this instance, they are employed in front of the wheels W. Chocks 10 are operatively supported for handling by preferably short sections of chain, as 12. These chains, of which there should be two for each chock, to provide transverse stability with respect to the truck, are connected to the chock positioning levers 14. These levers are fixedly secured to the partially revolvable shaft 16. The bearings in which shaft 16 revolves or operates under the restriction imposed by the link, as shown, are secured to the truck body in some suitable manner. They are, in other words, attached above the spring suspension system. This has been found desirable in order that it be relieved of the extreme vibrations of road shock as experienced by the spring-supported elements such as the axle and wheels, and also to simplify the connecting of the control means. As shown in Figs. 2 and 3, the positioning levers 14 are simple bars. Shaft 16 is controlled angularly by the lever or arm 18, which is also fixedly secured to shaft 16. Operatively connected to the operating lever 18 is a connecting rod 20. Rod 20 is pivotably secured at one end of the toggle bar 22, which bar is pivotably supported on the fixed pivot of 24.

A forward connecting rod 26 is pivotably secured to the opposite end of toggle bar 22, and is operatively connected in some suitable manner to manual lever 28. Lever 28 is pivoted, as at 30, through a fixed fulcrum or pivot, and also pivotably secured at 32 to a slider or movable bearing member 34, which is free to slide longitudinally of rod 26 and is limited only by the end buffer member 36 on the extreme end of rod 26. A retraction spring 38 is employed to normally always retract lever 28 so that the handle portion will be forward and tend to be out of the way, and also to provide that the operator in an emergency knows exactly where the lever is. This is quite important when trucks are operated in the dark, for instance. Spring 38 is secured to some fixed anchor, as 40.

In both forms of my device, the toggle member and its associated parts play a very important part. This toggle member, as 22, of Fig. 3 is so positioned and proportioned that it acts as a toggle when the tension of spring 42 is applied to one of the extremities. Spring 42 is fixedly secured to some point on the vehicle as 44, and the relationship, as shown in Fig. 3, is such that once the movement of toggle bar 22 has been initiated so that the spring 42 passes across the pivot point 24, the spring will continue the effort and complete the cycle of operation. This functions when lever 28 is pulled backwardly, and as soon as spring 42 has passed center 24, it completes the operation and deposits the chock on the ground in close proximity to wheel W.

If we will assume that the chock 10 is on the ground and wheel W in contact with it, after the showing in Fig. 1, and it is desired to move the truck, the first action before the truck can go ahead is to back the truck up; in so doing, due to the linkage 12, the chock itself will stay at rest while the wheel moves away from it. The movement of the vehicle, of course, carries with it all the parts of the mechanism excepting the chock, and when the movement has progressed far enough so that the angularity of chain 12 is changed from that shown in Fig. 2, then the chock, due to its inertia, will operate to move the lever 14 to the right as viewed in Fig. 2, and thus move through rod 20 and its associated arms, and the toggle arm 22 so that it passes spring 42 across its center 24. The spring will then take over and complete the movement of toggle bar 22, and raise the chock to the dash-line position as shown in Fig. 2.

In Figs. 4 and 5, and as supplemented by Figs. 6 and 7, I have shown what is probably the more generally acceptable embodiment of my chock and operating mechanism. In this instance, the truck T may be assumed to be on an ascending grade, and would normally tend to roll backwardly, and in this situation, the chocks 10 are shown behind the wheels, as in Fig. 4, so as to prevent retrograde movement. In this arrangement, the toggle bar 22, of substantially the same form as shown in Fig. 3, is employed. A spring 42 is employed to complete the toggling action.

Associated with toggle bar 22 and its supporting and comprising elements are the same connecting rods 20 and 26. In this instance, I have illustrated, however, that rod 26 is operatively connected to a fluid cylinder 50, which may be air, or vacuum, or liquid operated. A control valve is provided at 52 with a control lever 54, and fluid is supplied and exhausted out through pipes 56 and 57. Suitable connecting pipes connect valve 52 with cylinder 50. In this connection, it is desired to point out, however, that electric means might be employed. Further, the lever as shown in Fig. 2, for instance, could still be employed to manually operate this mechanism. The other forms of operation seem more practical for the larger trucks, however, in that the larger vehicles normally are provided with motive power for the operation of auxiliary equipment.

In a heavy truck, which is illustrated in Figs. 4 and 5, there may be quite a range of spring deflection. Consequently, in addition to the chain linkage 12, I provide a broken or pivoted lever in lieu of the simple arm 14 of the lighter construction. This pivoted lever consists of the upper lever arm 60 which is fixedly secured to shaft 16, which shaft in turn is pivotally supported by brackets 62, which are attached to the truck body or frame. Pivotably secured, as by pivot bolt 64, to the lower end of arm 60, is the lower arm 66. The construction of this pivot is probably best illustrated in the exploded view of Fig. 6, wherein the pivot pin 64 passes through arms 60 and 66. Attention is next invited to the fact that a plurality of outstanding detents or nubbins are provided at 68, normally disposed in a concentric circle around bolt 64. Also concentrically arranged and adapted to co-act with the spaced nubbin 68, are a plurality of depressions 70 formed in arm 60, so that the detents 68 can assume a variety of adjusted positions in depression 70. In order that this be a slidable or slippable arrangement, I provide a compression spring 72, which is backed up by washer 73 and nut 74 which can be adjusted and then locked by the castellated nut arrangement shown. Functioning of this joint is insured by the rotation of shaft 16 and with the assistance of the bifurcated arm or fork 76, which is slidably secured at one end by the pin and slot arrangement shown at 78, which in turn is secured to the truck body and which, at its opposite end, is pivotably secured at 80 to the lower arm 66. The functioning of this equipment will be best understood, it is believed, by a perusal of the solid-line and the dash-line positions shown in Fig. 5. This arrangement gives full control of chock 10 in the up or down positions. It makes it possible to give the block a forward snap as it is being lowered to the ground so that it will actually come to rest on the ground at a position normally forward of the position that it would have assumed if it hung by gravity from chains 12. There is another advantage of such an arrangement in that many of the States have laws requiring spatter shields in rear of the wheels so that other passing vehicles will not be inconvenienced or placed under hazard by flying particles from the big truck tires. In many cases, these shields are by law required to be within a short distance of the wheels, and it has been found that by breaking the chock supporting arm, it is possible to come within the requirements as set up by the existing law. It will be understood that on the lighter vehicles, as shown in Figs. 1 and 2, this equipment is not necessary in that the lighter vehicles are permitted to use the conventional fenders.

In Fig. 7, I have illustrated two downwardly extending rest members, as 84 and 86. These members are centered to be secured by some convenient bracket arrangement to the truck frame or body and to have the forked members shaped to fit the upper surfaces of the chock block 10, after the showing in Fig. 7, so that rattling will be prevented and the chock will not swing about as the truck passes over rough roads, and when they are desired for use, they will be held in a definite position so that their movement to a position of use will be under full control, and their outward positioning can be assured.

The operation of toggle bar 22, in the heavy truck arrangement is identical in its functions with that previously explained under reference to Fig. 3. In other words, the placement of the chock need only be initiated to the point where the spring 42 passes over center 24 and the toggle action will complete the movement and with a uniform required snap which might not be achieved if any manual or mechanical control was employed. As the truck moves away from the chock, the weight of the chock is sufficient to cause the spring 42 to again pass over center 24 and thus the toggle action will complete the raising of the chock and its final resting in forks 84 and 86.

It is believed that it will be clearly apparent from the above description and the disclosure in the drawings that the invention comprehends a novel construction of a self retracting wheel chock for automotive vehicles.

Having thus disclosed the invention, I claim:

1. A self retracting wheel chock for automotive vehicles, consisting of: a wheel chock adapted to rest on the roadway surface in the path of movement of a wheel; a revolvable shaft, supported from the vehicle body, having arms secured thereto adapted to raise and lower said chock; a spring controlled joint in said arms adapted to be self actuated in the raising and in the lowering of said chock; means for initiating the lowering movement of said chock; a toggle action mechanism disposed between said revolvable shaft and said initiating means; a spring adapted to complete the movement of said toggle after it has partially completed its movement; said toggle adapted to be started on its movement to raise said chock by the displacement of the vehicle it is supported from.

2. A self retracting wheel chock for automotive vehicles, consisting of: a wheel chock adapted to rest on the roadway surface in the path of movement of a wheel; a revolvable shaft, supported from the vehicle body, having arms secured thereto adapted to raise and lower said chock; line connecting means disposed between said arms and said chock; a spring controlled joint in said arms adapted to be actuated in the raising and in the lowering of said chock; means for initiating the lowering movement of said chock; a toggle action mechanism disposed between said revolvable shaft and said initiating means; a spring adapted to complete the movement of said toggle after it has partially completed its movement; said toggle adapted to be started on its movement to raise said chock by the displacement of the vehicle it is supported from and positioning means for said chock when the same is in its inoperative position.

ROBERT H. EDWARDS.

REFERENCES CITED

The following references are of record in the file of this patent:

UNITED STATES PATENTS

| Number | Name | Date |
| --- | --- | --- |
| 1,267,999 | Fretz | May 28, 1918 |
| 1,310,209 | Ostolaza | July 15, 1919 |
| 1,506,644 | Jordan | Aug. 26, 1924 |
| 1,653,420 | Van Koolbergen | Dec. 20, 1927 |
| 1,990,101 | Smith | Feb. 5, 1935 |
| 2,252,878 | Bella et al. | Aug. 19, 1942 |
| 2,386,595 | Gonnell et al. | Oct. 9, 1945 |